J. B. STANLEY & M. D. SMITH.
MACHINE FOR THROATING SPOKES.
No. 7,285. Reissued Aug. 29, 1876.
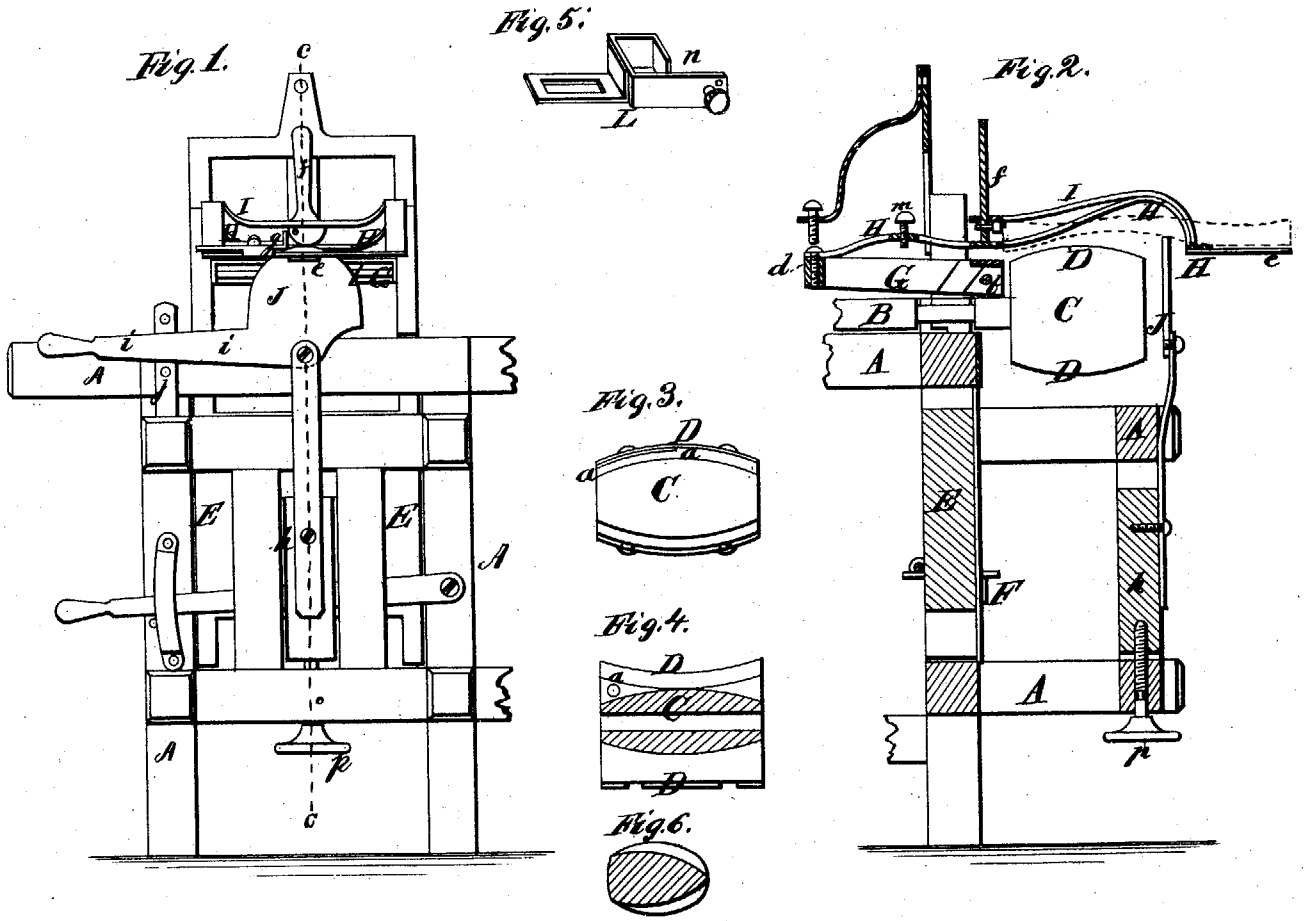
WITNESSES
Robert Everett
George E. Upham.
INVENTORS.
Joseph B. Stanley.
Matthew D. Smith.
Gilmore, Smith & Co.
ATTORNEYS.
N. PETERS, PHOTO-LITHOGRAPHER, WASHINGTON, D. C.

UNITED STATES PATENT OFFICE.

JOSEPH B. STANLEY AND MATTHEW D. SMITH, OF TOUGH KENAMON, PA.

IMPROVEMENT IN MACHINES FOR THROATING SPOKES.

Specification forming part of Letters Patent No. 128,823, dated July 9, 1872; reissue No. 7,285, dated August 29, 1876; application filed June 24, 1876.

*To all whom it may concern:*

Be it known that we, JOSEPH B. STANLEY and MATTHEW D. SMITH, of Tough Kenamon, in the county of Chester and State of Pennsylvania, have invented a new and valuable Improvement in Machines for Throating Spokes; and we do hereby declare that the following is a full, clear, and exact description of the same, and of the operation thereof, reference being had to the annexed drawings, making a part of this specification, and to the letters and figures of reference marked thereon.

In the annexed drawings, Figure 1 represents a front elevation of our improved spoke-machine. Fig. 2 is a vertical longitudinal section of the same, taken on the line *c c* of Fig. 1. Fig. 3 is a detail side view of our improved cutter-head; Fig. 4, a longitudinal section of the same; Fig. 5, a perspective view of a detachable gage, which is used in holding a spoke to be tapered; and Fig. 6, a transverse section through the throat of the spoke.

Similar letters in the different figures indicate corresponding parts.

This invention relates to machines for throating spokes; and it consists in a cutter-head provided with concave rotating knives, which have their middle parts farther from the axis of said cutter-head than are their ends, so as to cut a concavity or throat upon the spoke; also, in an eccentric support for the spoke while in contact with said cutters, so that the cut may be tapering, making the spoke thinner at the face than at the back; and, finally, in auxiliary devices, hereinafter particularly described.

In the annexed drawings, A represents the frame of the machine, and B the shaft carrying the cutter-head C, on which are attached the cutters or cutting-knives D D. These cutters are made convex relatively to the axis of the cutter-head C, so that the middle portions of said cutters are farther from said axis than are the ends of said cutters. The result of this conformation of said cutters is that the middle parts thereof cut more deeply into the spoke than do the ends of said cutters; and, as the curve of said cutters is perfectly regular, a smooth concavity or throat will be produced upon the spoke at a single stroke. Said cutters are also made concave relatively to the plane of a longitudinal section through said cutter-head, or to the direction of rotation, so that the ends of said cutters will first come in contact with the spoke, and then the rest of the curve of said cutters, the middle part thereof cutting last of all. This construction makes the cutting oblique and gradual, and thereby saves the spoke from being torn, and the cutters from being unnecessarily worn. If one end of a cutter begins to tear the wood, the other end will immediately counteract this effect by cutting away the chip so produced. This device may be adapted to use for tapering tenons by applying a small additional cutter, *a*, under one of the main cutters D, as shown in Fig. 4. On a vertical slide, E, which is arranged on the frame A, back of the cutter-head C, and which can be set up or down by means of a lever, F, is pivoted, by horizontal pivots *b b*, a backwardly-extending frame, G. The spoke-carrying frame H is pivoted by a vertical pin, *d*, to the back of the frame G. The frame H extends over the cutter-head C, and has a handle, *e*, at the front end, whereby it can be swung to one side or the other. A clamp, I, regulated by a cam-lever, *f*, is applied to the top of the frame H, to hold the spoke in place, which rests against laterally-adjustable gages *g*. J is an eccentric, secured to a sliding standard, *h*, in front of the cutter-head C, and provided with a handle, *i*, whereby it can be swung more or less to the side, and held in suitable position by pins *j j*, in an upright guide, *l*. By means of a screw, *p*, bearing against the lower side of the sliding standard *h*, the height of the eccentric can be regulated. The eccentric J constitutes the guide above the cutters D D for the spoke that rests upon the frame H, and by its means the peculiar rounded bevel and throat of the spokes is produced, which leaves the spokes thin at the face and thick at the back, as shown in Fig. 6. The degree of throat is controlled by means of screw *p*. This is a very important novelty in spoke-machines, and permits the convenient production of suitable patterns. While the spoke is on the lower part of the eccentric, it is hollowed more by the cutters than when held higher by the same support. When the machine is to be used for tapering the spoke at the outer end, the gage L (shown in Fig. 5)

is attached to the shank of the frame H by means of a screw or pin, *m*, and serves then to receive the spoke-tenon between its ear *n* and screw *o*.

What we claim as new, and desire to secure by Letters Patent, is—

1. In a machine for throating spokes, a cutter-head provided with concave rotating knives, having concave edges, the concavity of the cutting-edge being less than the concavity of the body of the rotating knife, substantially as and for the purpose set forth.

2. In a spoke-throating machine, the spoke-holder H, pivoted to the frame G, which is applied to the vertical slide F, substantially as and for the purpose set forth.

3. The eccentric spoke-support J, arranged in front of the cutter-head, under the spoke-carrier, substantially as and for the purpose set forth.

4. The gage L, arranged in combination with the spoke-holder H, substantially as and for the purpose set forth.

In testimony that we claim the above we have hereunto subscribed our names in the presence of two witnesses.

JOS. B. STANLEY.
M. D. SMITH.

Attest:
WILLIAM MULLEE,
GEORGE MULLEE.